United States Patent [19]

Fryer et al.

[11] 3,865,815

[45] Feb. 11, 1975

[54] 7-HYDROXYAMINO-1,4-BENZODIAZEPINES

[75] Inventors: Rodney Ian Fryer, North Caldwell; Armin Walser, West Caldwell, both of N.J.

[73] Assignee: Hoffmann-La Roche Inc., Nutley, N.J.

[22] Filed: Nov. 29, 1973

[21] Appl. No.: 420,118

[52] U.S. Cl. ............................ 260/239.3 D, 424/244
[51] Int. Cl. .............................................. C07d 53/06
[58] Field of Search ............................. 260/239.3 D

[56] References Cited
UNITED STATES PATENTS
3,391,138  7/1968  Archer et al................. 260/239.3 D Primary Examiner—Henry R. Jiles
Assistant Examiner—Robert T. Bond
Attorney, Agent, or Firm—Samuel L. Welt; Bernard S. Leon

[57] ABSTRACT

Novel 1,4-benzodiazepine derivatives, substituted in the 7-position with a hydroxyamino group or an alkylated or acylated derivative thereof, are disclosed together with processes for the preparation of these compounds. These novel benzodiazepines are useful as sedative, muscle relaxant an anti-convulsant agents.

13 Claims, No Drawings

7-HYDROXYAMINO-1,4-BENZODIAZEPINES

DETAILED DESCRIPTION OF THE INVENTION

The present invention relates to novel 1,4-benzodiazepin-2-ones which bear a hydroxyamino group or an alkylated or acylated derivative thereof in the 7-position. The invention further comprehends processes for making these novel benzodiazepines.

More specifically, the compounds of the present invention are selected from the group consisting of compounds of the formula

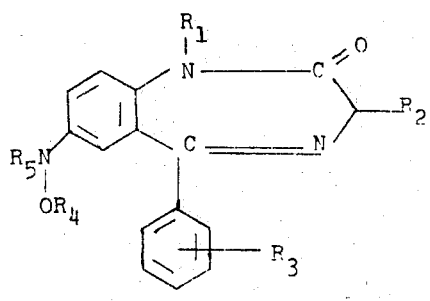

I wherein $R_1$ signifies lower alkyl, hydroxylower alkyl, cycloalkyl-lower alkyl, lower alkoxy-lower alkyl or di-lower alkylaminolower alkyl; $R_2$ signifies hydrogen or lower alkyl; $R_3$ signifies hydrogen or halogen; $R_4$ signifies hydrogen or lower alkyl; $R_5$ signifies hydrogen as the group $-COR_6$, wherein $R_6$ is lower alkyl or halo-lower alkyl and the pharmaceutically acceptable acid addition salts thereof.

As used herein the term "lower alkyl" either alone or in combination refers to straight and branched chain hydrocarbon groups containing from 1 to 7, preferably from 1 to 4 carbon atoms such as for example, methyl, ethyl, propyl, isopropyl, isobutyl, butyl and the like. The term "halogen" refers to all four forms thereof, i.e. bromine, chlorine, fluorine and iodine. The term "lower alkoxy" designates straight or branched chain saturated hydrocarbonoxy groups containing from 1 to 7 carbon atoms preferably 1 to 4 carbon atoms such as methoxy, ethoxy, propoxy and the like. The term "cycloalkyl" refers to cycloalkyl groups containing from 3 to 7 carbon atoms such as cyclopropyl, cyclobutyl, cyclopentyl and the like. The term "halo-lower alkyl" refers to halogenated alkyl groups such as chloromethyl, di-chloromethyl, trifluoromethyl and the like.

Preferred among the compounds falling within the scope of formula I above are those wherein $R_4$ and $R_5$ signify hydrogen, ie. compounds of the formula

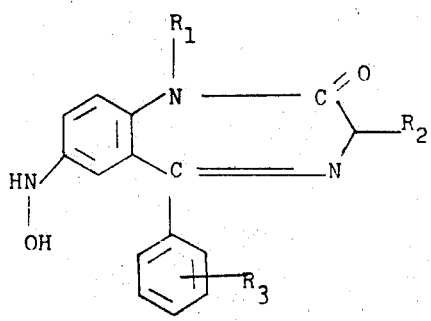

Ia wherein $R_1$, $R_2$ and $R_3$ are as described above, and the pharmaceutically acceptable acid addition salts thereof.

Also preferred among the compounds of formula I above are those wherein $R_4$ signifies hydrogen and $R_5$ signifies the group $COR_6$, $R_6$ being as defined above i.e. compounds of the formula

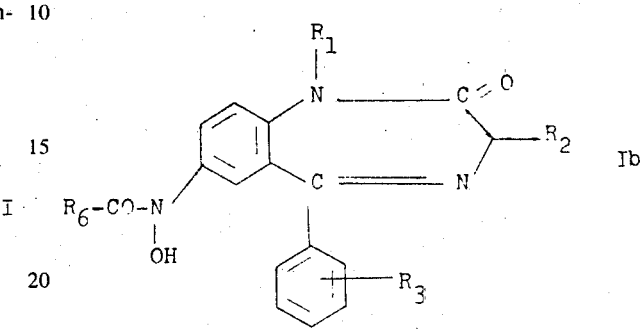

Ib wherein $R_1$, $R_2$, $R_3$ and $R_6$ are as described above, and the pharmaceutically acceptable acid addition salts thereof.

Still another preferred class of compounds falling within the scope of formula I above are those wherein $R_4$ signifies lower alkyl and $R_5$ signifies the group $COR_6$, $R_6$ being as defined above, i.e. compounds of the formula

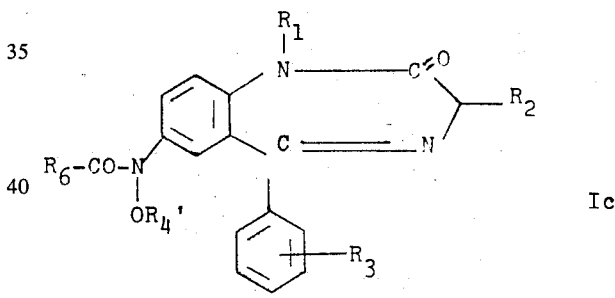

Ic wherein $R_4'$ signifies lower alkyl and $R_1$, $R_2$, $R_3$ and $R_6$ are as described above,
and the pharmaceutically acceptable acid addition salts thereof.

Another class of compounds falling within the scope of formula I above are those wherein $R_4$ signifies lower alkyl and $R_5$ signifies hydrogen, i.e. compounds of the formula

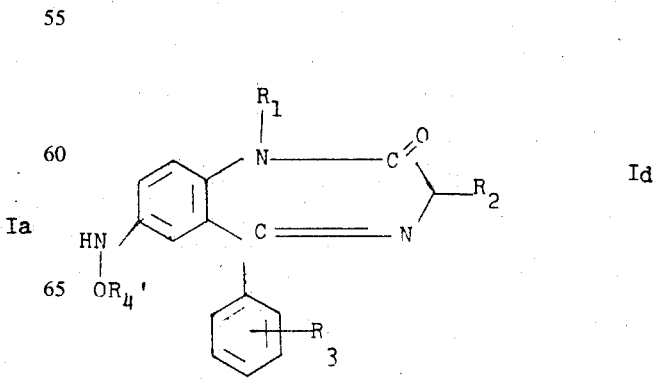

Id wherein $R_1$–$R_3$ and $R_4'$ are as described above,
and the pharmaceutically acceptable acid addition salts thereof.

When the $R_1$ substituent signifies lower alkyl, methyl is preferred; when $R_1$ signifies hydroxy lower alkyl, hydroxyethyl is preferred; when $R_1$ signifies lower alkoxy-lower alkyl, methoxymethyl is preferred; when $R_1$ signifies cycloalkyl-lower alkyl, cyclopropylmethyl is preferred and when $R_1$ signifies di-lower alkyl amino lower alkyl, di-ethylamino ethyl is preferred. When the $R_3$ substituent is halogen it is preferably located in the ortho position of the 5-phenyl ring and chlorine and fluorine are the preferred halogen groups. The preferred lower alkyl group for the $R_4$ and $R_6$ substituents is methyl, while the preferred halo lower alkyl group for the $R_5$ substituent is trifluoromethyl.

Representative of the compounds of formula I above are 1,3-dihydro-7-hydroxyamino-1-methoxymethyl-5-phenyl-2H-1,4-benzodiazepin-2-one; 1,3-dihydro-7-(N-hydroxyacetamino)-1-methoxymethyl-5-phenyl-2H-1,4-benzodiazepin-2-one; 1,3-dihydro-7-(N-methoxyacetamino)-1-methoxymethyl-5-phenyl-2H-1,4-benzodiazepin-2-one and 1,3-dihydro-7-methoxyamino-1-methoxymethyl-5-phenyl-2H-1,4-benzodiazepin-2-one.

The 7-hydroxyaminobenzodiazepines of formula Ia above are prepared by the selective reduction of the corresponding 7-nitrobenzodiazepin-2-one of the formula

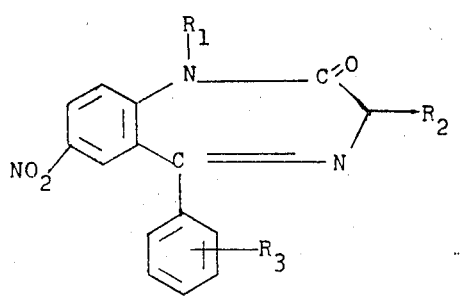

II wherein $R_1$ through $R_3$ are as described above.

The 7-nitrobenzodiazepine derivatives of formula II above are known compounds or can be prepared in analogy to the preparation of the known materials. The reduction of the 7-nitro group to the desired hydroxyamino group is accomplished by selective chemical or catalytic reducing systems. Suitable reducing systems for the present purposes include zinc in ammonium chloride and stannous chloride in a buffered system. Acetate, citrate or phosphate buffers are suitable with sodium acetate being preferred. This reduction is preferably effected in the presence of an inert organic solvent. Representative of the solvents that can be employed are alcohols such as methanol, ethanol and the like, water, ethers such as tetrahydrofuran, hydrocarbons such as hexane and the like, chlorinated hydrocarbons such as chloroform, methylenechloride and the like, acetone, dimethylformamide and dimethylsulfoxide. Temperature is not critical to this process aspect, so that temperatures above or below room temperature can be employed with room temperature being preferred.

The compounds of formula Ib above can be prepared by the acylation of the 7-hydroxyaminobenzodiazepines of formula Ia. This acylation can be effected by treating the compound of formula Ia with a suitable acylating agent.

Representative of the acylating agents that can be employed for the purposes of the present invention are acid anhydrides, such as acetic anhydride, trifluoroacetic anhydride and the like and acid halides such as acetyl chloride. This acylation reaction is preferably effected in the presence of an acid acceptor such as an inorganic or organic base for example, pyridine or sodium carbonate. It is also preferable to effect this reaction in the presence of an inert organic solvent. Suitable solvents include halogenated hydrocarbons such as methylene chloride, hydrocarbons such as hexane and the like, ethers such as tetrahydrofuran, dimethylformamide, dimethylsulfoxide and ethyl acetate. Temperature is not critical to this process so that temperatures above or below room temperature can be employed with room temperature being preferred.

The reaction of the 7-hydroxyaminobenzodiazepine of formula Ia with an acylating agent as described above usually leads to the formation of the di-acylated product of the formula

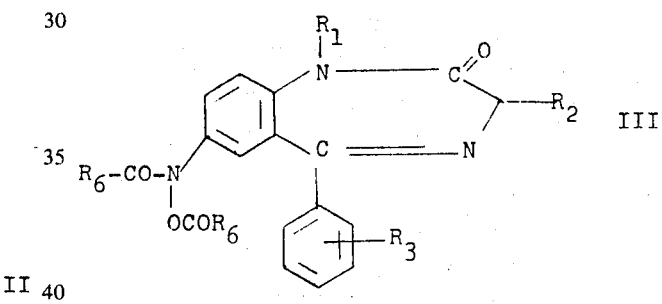

III wherein $R_1$ through $R_3$ and $R_6$ are as described above. If the diacylated product is obtained, it can readily be converted to the desired monoacyl product of formula Ib by the selective cleavage of the O-acyl group to yield the hydroxy group. The selective cleavage is accomplished by selective hydrolysis, for example, by treating the di-acylated product with an alkalimetal hydroxide for example, sodium hydroxide.

The compounds of formula Ic above are prepared by the alkylation of the hydroxamic acid derivative of formula Ib. This conversion is effected employing standard alkylating techniques. Representative of the alkylating agents that can be employed are alkyl/halides such as methylchloride or methyliodide, alkyl sulphates such as methylsulphate and the like and diazoalkanes such as diazomethane and the like. In carrying out this alkylation reaction, it is preferable to first form the sodium salt of the hydroxamic acid of formula Ib. This can be accomplished by treating the hydroxamic acid with a reagent such as sodium hydroxide, sodium hydride, sodium alcoholate and the like. It is expedient to effect this alkylation reaction in the presence of an inert organic solvent. Representative of the solvents that can be employed are hydrocarbons such as hexane, halogenated hydrocarbons such as methylene chloride, alcohols such as methanol, ethanol and the like, ethers such as tetrahydrofuran, dimethylformamide and dimethylsulfoxide. Temperature is not critical to this process aspect so that temperatures above or below room temperature can be employed with room temperature being preferred.

The compound of formula I above wherein $R_4$ signifies lower alkyl and $R_5$ signifies hydrogen can be prepared by the selective cleavage of the acyl group from the corresponding compound of formula Ic. This cleavage of the acyl group can be effected by employing standard hydrolysis techniques. For example, if $R_6$ signifies a halo-lower alkyl group such as trifluoromethyl, cleavage of the acyl group can be carried out by solvolysis, that is by dissolving the compound of formula Ic above so-substituted in an alcohol, such as methanol, and heating the solution. This cleavage can also be effected by treating the compound of formula Ic with a base, for example, an organic or inorganic base in water or in alcohol such as methanol. Suitable bases include triethylamine and pyridine. If the cleavage is effected by base treatment of the acyl derivative, it can be effected at room temperature or at a temperature above room temperature with the reflux temperature of the reaction medium being preferred; it is also expedient to effect this reaction in the presence of an inert solvent such as water, alcohols, for example methanol, ethanol and the like, ethers such as tetrahydrofuran, dimethylformamide, hydrocarbons such as hexane, or mixtures of these solvents, for example, methanol and water.

The compounds of formula I above form pharmaceutically acceptable acid addition salts with organic or inorganic acids. Thus the compounds of the present invention form pharmaceutically acceptable acid addition salts with inorganic acids such as hydrohalic acids for example, hydrochloric acid and hydrobromic acid and with organic acids such as tartaric acid, citric acid, camphor-sulfonic acid, ethane sulfonic acid, toluene sulfonic acid, phthalic acid, ascorbic acid, maleic acid, succinic acid, formic acid, acetic acid and the like.

The compounds of formulae Ia, Ib and Ic above as well as their pharmaceutically acceptable acid addition salts are useful as anticonvulsant, muscle relaxant and sedative agents while the compounds of formula Id are useful as muscle relaxant and sedative agents. Thus the compounds of the present invention and their pharmaceutically acceptable salts can be material as medicaments. For example, they can be used in the form of pharmaceutical preparations which contain them or their salts in ad-mixture with a pharmaceutical organic or inorganic carrier matrial which is suitable for enteral or parenteral application such as, for example, water, gelatin, lactose, starches, magnesium sterate, talc, vegetable oils, gum arabic, polyalkyleneglycols, vaseline, etc. The pharmaceutical preparations can be prepared in solid form (e.g. as tablets, dragees, suppositories, capsules) or in liquid form (e.g. as solutions, suspensions or emulsions). They may be sterilized and/or contain additives such as preserving, stabilizing, wetting or emulsifying agents, salts for varying the osmotic pressure or buffers. They can also contain other therapeutically valuable substances.

The compounds of formula I above or their pharmaceutically acceptable salts can be administered at dosages adjusted to individual requirements and fitted to the pharmaceutical exigencies of the situation. Convenient pharmaceutical dosages are in the range of from about 2 mg. to about 200 mg. per day.

The useful anticonvulsant activity of the compounds of formulae Ia, Ib and Ic above is shown in warm blooded animals utilizing the standard antimetrazole test. This test was carried out according to the method of Everett and Richard (*J.P.E.T.*, 81: 402, 1944). The $ED_{50}$ was calculated as the dose which would prevent convulsions in 50% of the mice tested after administration of 125 mg/kg of pentylenetetrazole by the subcutaneous route. Following these test procedures 1,3-dihydro-7-hydroxyamino-1-methoxy-methyl-5-phenyl-2H-1,4-benzodiazepin-2-one (Compound A), 1,3-dihydro-7-(N,hydroxyacetamino)-1-methoxymethyl-5-phenyl-2H-1,4-benzodiazepin-2-one (Compound B), and 1,3-dihydro-1-methoxymethyl-7-(N-methoxytrifluoroacetamino)-5-phenyl-2H-1,4-benzodiazepin-2-one (Compound C) show an $ED_{50}$ of 1.57 ± 0.17, 2.25 ± 0.47 and 2.8 ± 0.4 mg/kg respectively, indicating that these compounds exhibit anticonvulsant activity.

The sedative and muscle relaxant activity of the compounds of formula I above are shown using the standard foot shock test. In this test a pair of mice is confined under a 1 liter beaker placed on a grid which presents shock to the feet. At least five fighting episodes are elicited in a two minute period. Pairs of mice are marked and pretreated 1 hour prior to a second shock. Logarithmic dose intervals are utilized up to a maximum of 100 mg/kg. At the 100% blocking dose, three out of three pairs must be blocked from fighting. The measurements are made at the dose level at which 100% blocking is observed and the results are expressed as the dose in mg/kg ($PD_{50}$) which blocks the fighting response for 1-hour. Following these test procedures, compound A exhibits a $PD_{50}$ of 5.0, Compound B exhibits a $PD_{50}$ of 50, Compound C exhibits a $PD_{50}$ of 5.0 and 1,3-dihydro-7-methoxyamino-1-methoxymethyl-5-phenyl-2H-1,4-benzodiazepin-2-one (Compound D) exhibits a $PD_{50}$ of 100 mg/kg, indicating that these compounds possess sedative and muscle relaxant activity.

The following examples are illustrative of the present invention. All temperatures are given in degrees Centigrade.

EXAMPLE 1

Preparation of 1,3-dihydro-7-hydroxyamino-1-methoxymethyl-5-phenyl-2H-1,4-benzodiazepin-2-one A mixture of 33g of (0.1 mol) of 1,3-dihydro-1-methoxymethyl-7-nitro-5-phenyl-2H-1,4-benzodiazepin-2-one, 1 l of tetrahydrofuran, 1 l of methanol, 113g (0.5 mol) of stannous chloride dihydrate and 136g (1 mol) of sodium acetate trihydrate was stirred at room temperature for 6 hrs. under an atmosphere of nitrogen. The inorganic salts were separated by filtration over celite. The filtrate was evaporated and the residue was partitioned between methylene chloride and 1N sodium hydroxide solution. The methylene chloride layer was washed with water, dried and evaporated. Crystallization of the residue from methylene chloride/ether yielded the above-named product as light yellow crystals, mp 168°–170°. For analysis it was recrystallized from the same solvents, mp 168°–171°.

EXAMPLE 2

Preparation of 1,3-dihydro-7-hydroxyamino-1-methyl-5-phenyl-2H-1,4-benzodiazepin-2-one A mixture of 15g (0.05 mol) of 1,3-dihydro-1-methyl-7-nitro-5-phenyl-2H-1,4-benzodiazepin-2-one, 250 ml of tetrahydrofuran, 250 ml of methanol, 56g of stannous chloride dihydrate and 68g of sodium acetate trihydrate was stirred under nitrogen for 3 hours. 1 l of methylene chloride and 15 ml of conc. ammonia was added. The inorganic material was separated by filtration over celite. The filtrate was washed with 1N sodium hydroxide solution, was dried over sodium sulfate and evaporated. Crystallization of the residue from methylene chloride and recrystallization from ethanol/methylene chloride yielded the above-named light yellow product, with mp 211°–213°.

EXAMPLE 3

Preparation of 1,3-dihydro-5-(2-fluorophenyl)-7-hydroxyamino-1-methyl-2H-1,4-benzodiazepin-2-one A mixture of 16g (0.05 mol) of 1,3-dihydro-5-(2-fluorophenyl)1-methyl-7-nitro-2H-1,4-benzodiazepin-2-one, 500 ml of tetrahydrofuran, 250 ml of methanol, 68g of sodium acetate trihydrate and 56g of stannous chloride dihydrate was stirred under nitrogen for 6 hours. 25 ml of conc. ammonia was added and the inorganic salts were removed by filtration through celite. The filtrate was washed well with 2 l of tetrahydrofuran. The filtrate was evaporated and the solid residue was dissolved in ethanol/tetrahydrofuran. The solution was again filtered with celite and concentrated. The separated crystals were collected to yield the above-named light yellow product. For analysis it was recrystallized from ethanol/tetrahydrofuran, mp 228°–230°dec.

EXAMPLE 4

Preparation of 5-(2-Chlorophenyl)-1,3-dihydro-7-hydroxyamino-1-methoxymethyl-2H-1,4-benzodiazepin-2-one A mixture of 3.6g (0.01 mol) of 5-(2-chlorophenyl)-1,3-dihydro-1-methoxymethyl-7-nitro-2H-1,4-benzodiazepin-2-one, 100 ml of tetrahydrofuran, 50 ml of methanol, 13.6g of sodium acetate trihydrate and 11.25g of stannous chloride dihydrate was stirred under nitrogen for 5 hours. 500 ml of methylene chloride and 10 ml of conc. ammonia was added. The inorganic material was separated by filtration. The filtrate was washed with 1N sodium hydroxide solution, dried over sodium sulfate and evaporated. Crystallization of the residue from methylene chloride/ether gave the above-named light yellow product with mp 205°–208° dec. For analysis it was recrystallized from 2-propanol/tetrahydrofuran.

EXAMPLE 5

Preparation of 1,3-dihydro-7-(N-hydroxyacetamino)-1-methoxymethyl-5-phenyl-2H-1,4-benzodiazepin-2-one A mixture of 9.3g (0.03 mol) of 1,3-dihydro-7-hydroxyamino-1-methoxymethyl-5-phenyl-2H-1,4-benzodiazepin-2-one, 100 ml of pyridine and 15 ml of acetic anhydride was allowed to sit at room temperature for 16 hrs. The reagents were evaporated, at the end azeotropically with xylene. The residue was dissolved in 100 ml of methanol. The solution was cooled in ice-water when 100 ml of 1N sodium hydroxide solution was added. After standing at room temperature for 10 min, the reaction mixture was acidified with solid carbondioxide and was extracted with methylene chloride. The extracts were dried and evaporated. Crystallization of the residue from ether yielded the above-named yellow product with mp 205°–208° dec. For analysis it was recrystallized from methylene chloride/2-propanol.

EXAMPLE 6

Preparation of 1,3-dihydro-7-(N-hydroxy trifluoroacetamino)-1-methoxy methyl-5-phenyl-2H-1,4-benzodiazepin-2-one 10 ml of Trifluoroacetic anhydride and 20 ml of pyridine was added to a solution of 9.3g (0.07 mol) of 1,3-dihydro-7-hydroxyamino-1-methoxymethyl-5-phenyl-2H-1,4-benzodiazepin-2-one in 500 ml of methylene chloride cooled to −50°. Cooling was discontinued and the mixture was stirred for 5 min. When the temperature rose to −30° the reaction mixture was quenched with 20 ml of methanol and shaken with saturated sodium bicarbonate solution. The organic phase was separated, dried and evaporated. Crystallization of the residue from ether/petroleum ether yielded the above-named tan product with mp. 175°–178° dec. Recrystallization from methylene chloride/methanol/ether gave the product as off-white crystals with mp 183°–185° dec.

EXAMPLE 7

Preparation of 1,3-dihydro-7-(N-methoxyacetamino)-1-methoxymethyl-5-phenyl-2H-1,4-benzodiazepin-2-one 1.2g (0.0106 mol) of potassium t-butoxide was added to a solution of 3.6g (0.01 mol) of 1,3-dihydro-7-(N-hydroxyacetamino)-1-methoxymethyl-5-phenyl-2H-1,4-benzodiazepin-2-one in 40 ml of dimethylformamide cooled to −10°. After stirring for 10 min 1.5g (0.0106 mol) of methyliodide was added and stirring was continued for 15 min at room temperature. The solvent was partially evaporated under reduced pressure. The remaining warm solution was diluted with water and crystallized by seeding and cooling. Seeds were obtained by previous chromatographic purification over silica gel using 20% ethylacetate in methylene chloride. The crystals were collected and recrystallized twice from methylene chloride/ether/hexane to yield the above-named light yellow product with mp 125°–128°.

EXAMPLE 8

Preparation of 1,3-dihydro-1-methoxymethyl-7-(N-methoxytrifluoroacetamino)-5-phenyl-2H-1,4-benzodiazepin-2-one Ethereal diazomethane was added to a solution of 2g (0.005 mol) of 1,3-dihydro-7-(N-hydroxy trifluoroacetamino)-1-methoxymethyl-5-phenyl-2H-1,4-benzodiazepin-2-one in 40 ml of methylene chloride and 20 ml of methanol. After no more gas evolution was noticed (15 min) the mixture was evaporated and the residue was chromatographed over 60g of silical gel using 10% ethyl acetate in methylene chloride. Crystallization of the pure fractions from ether/hexane yielded the above-named product with mp. 110°–112°.

EXAMPLE 9

Preparation of 1,3-dihydro-7-methoxyamino-1-methoxymethyl-5-phenyl-2H-1,4-benzodiazepin-2-one 1 ml of triethylamine was added to a solution of 1g of 1,3-dihydro-1-methoxymethyl-7-(N-methoxytrifluoroacetamino)-5-phenyl-2H-1,4-benzodiazepin-2-one in 20 ml of methanol. After refluxing for 10 min the solvents were removed under reduced pressure and the residue was crystallized from ether to yield the above-named light yellow product with mp 147°–149°.

EXAMPLE 10

| Capsule Formulation | Per Capsule |
| --- | --- |
| 1,3-dihydro-7-hydroxyamino-1-methoxymethyl-5-phenyl-2H-1,4-benzodiazepin-2-one | 50 mg |
| Lactose, USP | 125 mg |
| Corn Starch, USP | 30 mg |
| Talc, USP | 5 mg |
| Total Weight | 210 mg |

Procedure:

1. The drug was mixed with lactose and corn starch in a suitable mixer.
2. The mixture was further blended by passing through a Fitzpatrick Comminuting machine with a No. 1A screen with knives forward.
3. The blended powder was returned to the mixer, the talc added and blended thoroughly.
4. The mixture was filled into No. 4 hard shell gelatin capsules on a Parke Davis capsulating machine.

EXAMPLE 11

| Capsule Formulation | Per Capsule |
| --- | --- |
| 1,3-dihydro-7-hydroxyamino-1-methoxymethyl-5-phenyl-2H-1,4-benzodiazepin-2-one | 10 mg |
| Lactose | 158 mg |
| Corn Starch | 37 mg |
| Talc | 5 mg |
| Total Weight | 210 mg |

Procedure:

1. The drug was mixed with the lactose and corn starch in a suitable mixer.
2. The mixer was further blended by passing through a Fitzpatrick Comminuting machine with a No. 1A screen with knives forward.
3. The blended powder was returned to the mixer, the talc added and blended thoroughly. The mixture was then filled into No. 4 hard shell gelatin capsules on a Parke Davis capsulating machine. (Any similar type machine may be used).

EXAMPLE 12

| Tablet Formulation | Per Tablet |
| --- | --- |
| 1,3-dihydro-7-hydroxyamino-1-methoxymethyl-5-phenyl-2H-1,4-benzodiazepin-2-one | 25.00 mg |
| Lactose, USP | 64.50 mg |
| Corn Starch | 10.00 mg |
| Magnesium Sterate | 0.50 mg |
| Total Weight | 100.00 mg |

Procedure:

1. The drug was mixed with the lactose, corn starch and magnesium stearate in a suitable mixer.
2. The mixture was further blended by passing through a Fitzpatrick Comminuting machine fitted with a No. 1A screen with knives forward.
3. The mixed powders were slugged on a tablet compressing machine.
4. The slugs were comminuted to a mesh size (No. 16 screen) and mixed well.
5. The tablets were compressed at a tablet weight of 100 mg using tablet punches having a diameter of approximately ¼ inch. (Tablets may be either flat or biconvex and may be scored if desired).

EXAMPLE 13

| Tablet Formulation | Per Tablet |
| --- | --- |
| 1,3-dihydro-7-hydroxyamino-1-methoxymethyl-5-phenyl-2H-1,4-benzodiazepin-2-one | 10.0 mg |
| Lactose | 113.5 mg |
| Corn Starch | 70.5 mg |
| Pregelatinized Corn Starch | 8.0 mg |
| Calcium Stearate | 3.0 mg |
| Total Weight | 205.0 mg |

Procedure:

1. The drug was mixed with the lactose, corn starch and pregelatinized corn starch in a suitable size mixer.
2. The mix was passed through a Fitzpatrick Comminuting machine fitted with No. 1A screen and with knives forward.
3. The mix was returned to the mixer and moistened with water to a thick paste. The moist mass was passed through a No. 12 screen and the moist granules were dried on paper lined trays at 110°F.
4. The dried granules were returned to the mixer, the calcium stearate was added, and mixed well.
5. The granules were compressed at a tablet weight of 200 mg using standard concave punches having a diameter of 5/16 inch.

We claim:

1. A compound of the formula

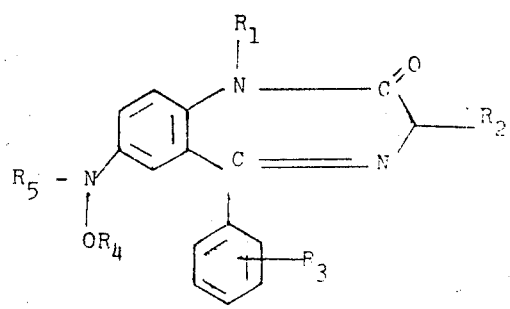

wherein $R_1$ signifies lower alkyl, hydroxylower alkyl, cycloalkyl-lower alkyl wherein the cycloalkyl group has 3 to 7 carbon atoms, lower alkoxy-lower alkyl or di-lower alkylaminolower alkyl; $R_2$ signifies hydrogen or lower alkyl; $R_3$ signifies hydrogen or halogen; $R_4$ signifies hydrogen or lower alkyl; $R_5$ signifies hydrogen or the group $-COR_6$, wherein $R_6$ is lower alkyl or halo-lower alkyl, and the pharmaceutically acceptable acid addition salts thereof.

2. A compound of claim 1 wherein $R_4$ and $R_5$ are hydrogen.

3. The compound of claim 2 of the formula 1,3-dihydro-7-hydroxyamino-1-methoxymethyl-5-phenyl-2H-1,4-benzodiazepin-2-one.

4. The compound of claim 2 of the formula 1,3-dihydro-7-hydroxyamino-1-methyl-5-phenyl-2H-1,4-benzodiazepin-2-one.

5. The compound of claim 2 of the formula 1,3-dihydro-5-(2-fluorophenyl)-7-hydroxyamino-1-methyl-2H-1,4-benzodiazepin-2-one.

6. The compound of claim 2 of the formula 1,3-dihydro-5-(2-chlorophenyl)-7-hydroxyamino-1-methoxymethyl-2H-1,4-benzodiazepin-2-one.

7. A compound of claim 1 wherein $R_4$ signifies hydrogen and $R_5$ signifies the group $-COR_6$, $R_6$ being lower alkyl or halo-lower alkyl.

8. The compound of claim 7 of the formula 1,3-dihydro-7-(N-hydroxyacetamino)-1-methoxymethyl-5-phenyl-2H-1,4-benzodiazepin-2-one.

9. The compound of claim 7 of the formula 1,3-dihydro-7-(N-hydroxy-trifluoroacetamino)-1-methoxymethyl-5-phenyl-2H-1,4-benzodiazepin-2-one.

10. A compound of claim 1 wherein $R_4$ signifies lower alkyl and $R_5$ signifies the group $-COR_6$, $R_6$ being lower alkyl or halo-lower alkyl.

11. The compound of claim 10 of the formula 1,3-dihydro-7-(N-methoxyacetamimo)-1-methoxymethyl-5-phenyl-2H-1,4-benzodiazepin-2-one.

12. The compound of claim 10 of the formula 1,3-dihydro-1-methoxymethyl-7-(N-methoxytrifluoroacetamino)-5-phenyl-2H-1,4-benzodiazepin-2-one.

13. 1,3-Dihydro-7-methoxyamino-1-methoxymethyl-5-phenyl-2H-1,4-benzodiazepin-2-one.

* * * * *